United States Patent Office 3,030,183
Patented Apr. 17, 1962

3,030,183
TITANIUM DIOXIDE FIBERS AND
THEIR PREPARATION
Kenneth L. Berry, Hockessin, Del., assignor to E. I. du
Pont de Nemours and Company, Wilmington, Del., a
corporation of Delaware
No Drawing. Filed Sept. 18, 1958, Ser. No. 761,700
5 Claims. (Cl. 23—202)

This invention relates to inorganic fibrous materials and their preparation. More particularly, this invention relates to fibrous titanium dioxide and a method for its preparation.

Titanium dioxide is well known as a white pigment used in the formulation of paints and in plastics and the like. It is also employed in small proportions in the preparation of synthetic sapphires and rubies to produce asterism by deposition of acicular rutile crystals in major crystallographic planes of the corundum lattice. Other acicular forms have also been reported but no titanium dioxide has heretofore been prepared in a form that can be characterized as fibrous.

It is an object of this invention to provide a new form of titanium dioxide and a process for its preparation. A further object is to provide a fibrous form of titanium dioxide which is capable of being felted. A still further object is to provide mats or felts of titanium dioxide fibers. Another object is to provide useful articles prepared from titanium dioxide fibers. Other objects will appear hereinafter.

These and other objects are accomplished by the present invention of feltable titanium dioxide fibers. These fibers can be prepared by bringing a titanium tetrahalide and oxygen into contact with a metal halide melt.

The titanium dioxide fibers of this invention have a fiber cross-section of less than 25 microns and an axial ratio, i.e., ratio of length to cross-sectional dimension, of at least 10:1. It is preferred that the cross-section be less than 5 microns. For the most part the length of the fibers ranges from 0.2 mm. to 5 mm. or more. The fibers can be formed into mats or felts possessing outstanding utility as thermal insulation, and such matted fibers constitute a part of this invention.

The preferred fibers which produce the best felted structures are those having an axial ratio in excess of 100:1, and products with ratios as high as 500:1 or more can be prepared by the above process. The individual fibers are colorless but when matted together they appear white. X-ray diffraction analysis of these fibers indicates that the atomic arrangement is predominantly of the rutile type.

These fibrous titanium dioxide products are prepared by reaction of a titanium tetrahalide, including titanium tetrachloride, tetrabromide and tetraiodide and mixtures thereof, with oxygen in the presence of a metal halide melt. Because of availability and ease of vaporization, it is preferred that the titanium tetrahalide be titanium tetrachloride. Although the titanium tetrahalide may contain minor proportions of titanium tetrafluoride, better results are obtained when the reactants are fluoride-free.

The temperature at which this process is carried out is not critical but must be sufficient to maintain the reaction medium in molten condition. Excessively high temperatures are to be avoided because they promote undesirable side reactions, because of practical difficulties in securing suitable materials for construction of equipment and because of the additional expense involved in maintaining such temperatures. Temperatures from about 550° to 1000° C. and higher are operable, but temperatures of 600–900° C. are usually employed. Fibers exhibiting high axial ratios and other desirable properties are produced at temperatures in the range of 600–800° C.

The process of this invention can be carried out at atmospheric pressure and provision of equipment capable of withstanding pressures greatly in excess of atmospheric pressure is not necessary. In certain cases, operation at pressures slightly above atmospheric pressure may be beneficial, for example, to prevent access of moisture from the atmosphere, and to increase the solubility of the titanium halide in the molten salt. This increased solubility has beneficial effects on rate of formation, yield and quality of product. It is also possible to operate at reduced pressures.

The reaction medium may be an individual metal halide or a mixture of metal halides having a melting point at a temperature below the desired operating temperature. Halides of the alkali and alkaline earth metals are particularly desirable melt constituents. The halogen of the metal halide can be the same or different from that of the titanium tetrahalide. It is preferred that fluorides be present only in minor proportions, if at all. Suitable media are, for example, potassium chloride, potassium bromide, sodium chloride, lithium chloride, calcium chloride, sodium iodide, barium chloride, and the like. For economic reasons, metal chloride melts are preferred.

Oxygen is necessary for the conversion of the titanium halide to fibrous titanium dioxide and may be introduced in pure form if desired. However, mixtures of oxygen with an inert gas such as nitrogen may also be employed, and air is a particularly convenient source of oxygen for use in this process. For best results, it is necessary that the air or oxygen be anhydrous in order to avoid hydrolysis of the titanium halide which produces a nonfibrous form of titanium dioxide.

The time of reaction is not critical and may be varied within wide limits, depending upon the amount of titanium tetrahalide to be converted and the rate at which it is introduced into the reaction medium. In the examples which follow reaction times ranging from a few hours to several days are illustrated.

The proportion of oxygen to titanium tetrahalide should be at least that stoichiometrically required to convert all the titanium tetrahalide to titanium dioxide. Using TiCl$_4$ as an illustration, $$TiCl_4 + O_2 \rightarrow TiO_2 + 2Cl_2$$

To insure complete reaction, an excess of oxygen is usually employed. The oxygen may be introduced separately from the titanium tetrahalide or may be mixed therewith prior to introduction to the melt. The reactants may be conveniently mixed by bubbling oxygen or dry air through the titanium tetrahalide maintained at a temperature such that the desired ratio of oxygen to titanium tetrahalide in the effluent gas is obtained. This gas mixture is then introduced into the metal halide melt.

It is necessary for the formation of the fibrous titanium dioxide of this invention that the reaction between titanium tetrahalide and oxygen occur in the salt melt. The occurrence of reaction elsewhere in the reaction system leads to the formation of finely divided pigment-type titanium dioxide and is to be avoided.

When the reactants are introduced separately to the metal halide melt, e.g., by exposing a melt into which titanium tetrachloride has been passed to oxygen, oxidation occurs at the surface and produces a thick orange crust made up of titanium dioxide fibers in tight parallel array perpendicular to the surface of the melt. On cooling, these fibers become colorless and may be readily isolated and dispersed by agitation in water to dissolve the solidified salt matrix. Any nonfibrous titanium dioxide inadvertently produced is easily removed from the suspension by settling and the fibrous product recovered by any convenient means such as filtration, decantation, and the like. Mats or felts of titanium dioxide fibers are produced from such suspensions by filtration as for example through a Fourdrinier screen. Other methods known to the art such as screening or tabling may be used to concentrate the fibrous rutile.

The most coherent and flexible felted mats are produced by filtration of suspensions of the finest fibers having the greatest ratios of axial dimensions. Thus, when dilute (less than 1%) suspensions are agitated vigorously and then allowed to stand, any adventitious, large crystals having the normal, nonfibrous habit or thick, needle forms or aggregates thereof quickly settle out and the more desirable material still in suspension can be decanted therefrom. When the decanted suspension is again allowed to stand, the most fibrous material flocculates and entangles under the influence of gravity and the gentle agitation of natural convection currents. This flocculation results in accelerated sedimentation of this preferred product which can then be isolated by decanting the suspending phase which now contains any fine powder inadvertently produced.

The properties of mats produced by filtration can be varied considerably in the sedimentation process by the relative amounts of coarse and fine titanium dioxide forms permitted to remain with the fibers. Thus, stiffer mat structures result by retention of coarser fibers and needles, while fine forms of titanium dioxide or other materials can be retained in the fiber mat to alter density or porosity and other properties. Thus, in effect, fibrous rutile can be used as a binder for other forms of titanium dioxide. Such products can be used alone or other fillers and extenders such as silica, carbon, asbestos and many other substances can be introduced to provide additional desirable properties. The bulk density and other properties of felted mats from titanium dioxide fibers can also be varied widely by suitable choice of fiber and suspension characteristics, and by the conditions, e.g., pressure, and temperature, under which the suspending medium is separated from the fibers.

Although water is the most useful and practical dispersing and suspending medium, other liquids such as alcohols, hydrocarbons and other organic compounds can be used. The properties of these suspensions can be modified by the addition of dispersing agents; and binders such as organic resins, sodium silicate, colloidal alumina or silica, can be conveniently introduced when desired, directly to such suspensions.

The invention is illustrated by the following examples in which parts by weight are employed. These examples are for purposes of illustration of preferred procedures for the preparation of the novel fibrous titanium dioxide of this invention.

*Example I*

Potassium chloride (17.1 g.) was placed in a 1½" diameter x 12" inclined silica tube, closed at the bottom and having the top fitted with gas inlet and exit tubes. The potassium chloride in the bottom of the tube was melted and maintained at a temperature of 790–800° C. Air, which had previously been dried by passage through two traps in series cooled to —80° C., was bubbled through titanium tetrachlodide at room temperature and the resultant titanium tetrachloride-air mixture passed over the surface of potassium chloride melt. The gases dissolved in the melt and reacted to produce a crust of titanium dioxide fibers as described above. During 6 hours, 2.3 g. of titanium tetrachloride was consumed and $Cl_2$ was continuously evolved in the exit gases.

After cooling, potassium chloride and other soluble materials were removed from the contents of the tube by extraction with water leaving an insoluble phase consisting of titanium dioxide in the form of feltable fibers up to about 2 mm. in length. Titanium dioxide which had collected on the walls of the tube in the vapor phase region was composed of submicroscopic, prismatic, pigment-type particles.

*Example II*

Following the general procedure employed in Example I, dry air at the rate of about 30 cc./minute was passed through titanium tetrachloride and thence into a silica tube containing, in a silica boat, a molten mixture of 12.3 g. of potassium chloride and 7.9 g. of sodium chloride at a temperature of 650–675° C. During 20.8 hours, 4.8 g. of titanium tetrachloride was consumed.

After cooling, water extraction of the contents of the boat yielded colorless, transparent, titanium dioxide fibers up to about 3 mm. in length showing excellent fiber form with smooth contours. These fibers were less than 5 microns in cross-section and some were less than 1 micron. An aqueous suspension of these fibers was passed through a filter to deposit the fibers as a coherent, thin, paper-like mat. X-ray diffraction analysis of a representative portion of the fibers showed them to be about 93% rutile and the remainder anatase.

*Example III*

The above example was repeated except that larger quantities of melt (total weight 60.6 g.) were employed and that the titanium tetrachloride and air were introduced separately into the melt by means of tubes extending beneath the surface. Dry nitrogen was employed as a carrier gas for the titanium tetrachloride. During 51 hours of operation, 5.7 g. of titanium tetrachloride was consumed and a crust of solid formed on the surface of the melt. The effluent gases were essentially free of titanium tetrachloride and contained chlorine.

After cooling and removal of water-soluble components, the water-insoluble product was fractionated by decantation. There was thus obtained an excellent collection of fibrous titanium dioxide composed of parallel arrays of lustrous, silky, colorless, transparent fibers less than 5 microns in cross-sectional dimension and up to 2–3 mm. long. X-ray diffraction analysis indicated that the fibers were composed entirely of a tetragonal structure of the rutile type.

*Example IV*

Potassium chloride and sodium chloride in the proportions employed in Example II were mixed, fused and again frozen. The resulting salt cake was broken into lumps, 100 g. of which was placed in the center of a silica tube mounted horizontally in a furnace. Upon heating to about 700° C., the salt melted and flowed to cooler zones, at the ends of the furnace, where it froze forming dams which retained the pool of molten salt within the furnace. Air was pre-dried by passage over phosphorus pentoxide and was bubbled at a rate of 12.4 cc. per minute through titanium tetrachloride maintained at 110–120° C. The resulting air-titanium tetrachloride mixture was passed over the molten salt for 5.5 days during which time the temperature of the furnace was maintained between 655–760° C. A total of about 10 g. of titanium tetrachloride was consumed. Chlorine gas was evolved and titanium dioxide fibers growing in the melt eventually almost plugged the tube. After cooling, the soluble components were removed from the product with water giving a suspension of fibrous titanium dioxide. These were purified by decantation leaving 3.12 g. of excellent fibers, many of which were in the form of parallel bundles which could be easily dispersed by vigorous agitation. Individual fibers were less than 5 microns in cross-sectional dimension and up to 3–4 mm. long. The fibers were shown by X-ray analysis to be entirely of the rutile structure.

A second preparation was carried out under the same conditions except that an air rate of 15 cc. per minute was employed. The product again was in the form of fibers less than 5 microns in cross-section and up to 2–4 mm. long.

Example V

A mixture (300 g.) of potassium chloride and sodium chloride in the weight ratio of 61:39 was melted in a silica tube as described in Example IV. The exit of the reaction tube was connected to two traps in series, each of which contained a column of concentrated sulfuric acid about 74 cm. tall. During operation, the exit gases passed through these two traps and developed a pressure in the reaction tube of about 1.26 atmospheres. An air-titanium tetrachloride mixture prepared as follows was introduced at the other end of the silica tube. Air, pre-dried by passage through a Dry-Ice trap and a bed of silica gel, was bubbled at the rate of 50 cc./minute (measured at 25° C. and under 1.26 atmospheres pressure) through titanium tetrachloride maintained at a temperature (in the liquid) of about 57° C. The resulting vapor had a temperature of about 44° C. The air-titanium tetrachloride mixture was passed over the molten salt maintained at a temperature of 700° C. for about 35 hours. About 25 g. of titanium tetrachloride was consumed and by-product chlorine was observed in the gaseous reaction products. A thick crust of fibrous titanium dioxide formed at the surface of the melt. The reaction mixture was cooled and water-soluble components were extracted to leave 6.8 g. of crystalline fibers of titanium dioxide that were separated by filtration. At least 65% of these fibers had lengths in the range of 0.5–3 mm. and cross-sectional dimensions of less than 5 microns.

A portion of the above product was suspended by vigorous agitation in about 1 liter of water and the suspension poured slowly onto a vibrating 100-mesh screen immersed about 1" below the surface in a tank of water. As the suspension was introduced, water was drained from the tank to maintain the level approximately constant. Vibration of the screen was continued for about 5 minutes, at the end of which time the fibrous titanium dioxide, retained by the screen, was removed and weighed. It had a dry weight of 2.6 g. The material which passed through the screen consisted of a mixture of granular and short fiber titanium dioxide and weighed 3.7 g.

The fibrous titanium dioxide retained on the screen was again suspended in water and treated as described above on a vibrating 60-mesh screen. The fibers retained thereby (0.66 g.) were converted to a self-supporting felt 2¼" in diameter and 1/16–1/8" in thickness by suction filtration of an aqueous suspension.

The infrared reflectance of this titanium dioxide felt was determined at a wavelength of 1 micron using a General Electric spectrophotometer with an integrating sphere attached against a magnesium carbonate standard. The fibrous titanium dioxide felt reflected 83% of the incident radiation as compared with reflectance of 72% for fiberglass and 82.5% for asbestos.

Example VI

A pool (300 g.) of fused KCl/NaCl/LiCl (42.5:33.3:24.2 weight ratio) was prepared as described in Example V. Dried air was bubbled at the rate of about 50 cc./minute through titanium tetrachloride (liquid at 95° C., vapor at 60° C.) and the resultant air-titanium tetrachloride mixture was passed at atmospheric pressure over the molten salt, maintained at 600° C. During a period of 70.5 hours, about 24 g. of titanium tetrachloride was consumed. Chlorine was detected in the gaseous by-products. At the end of this period, the reaction mixture was cooled and water-soluble components were extracted. There remained 7.6 g. of titanium dioxide fibers which were isolated by filtration. At least 45% of the fibers had lengths in the range of 0.5–1 mm. and about 5% of the product was 1–2 mm. in length. All these fibers were less than 5 microns in cross-sectional dimension.

Example VII

A mixture (300 g.) of potassium chloride, sodium chloride and calcium chloride in the weight ratios of 31.1:39.7:29.2 was heated to fusion in a silica tube as described in Example IV. During this heating, hydrogen chloride gas was passed through the tube at a rate of 40 cc. per minute to assure that no calcium oxide would be formed by reaction of calcium chloride with traces of water which might be present. When the temperature of the melt had reached 700° C. the flow of hydrogen chloride was stopped and an air-titanium tetrachloride mixture was passed through the tube. This mixture was prepared by bubbling air, dried by passage through a trap at −78° C. and through silica gel, at a rate of about 60 cc. per minute through titanium tetrachloride (liquid at 78° C., vapor at 59° C.) at atmospheric pressure. During a period of 75 hours, 38 g. of titanium tetrachloride was consumed and by-product chlorine was evolved at the tube exit.

After cooling the reaction mixture and extraction of water-soluble components, there remained 14 g. of titanium dioxide which was isolated by filtration. Microscopic inspection showed that about 10% of this product was in the form of fibers having lengths in the range of 0.5–2.5 mm. and diameters of 1–5 microns.

Fibrous titanium dioxide was also prepared in a similar manner at 600° C. This product was shown by X-ray to consist of mainly rutile-type titanium dioxide containing a trace of anatase.

The new feltable titanium dioxide fibers of this invention are stable and refractory, and they reflect infrared radiation to a very high degree. These properties render the fibers particularly useful in applications where a highly refractory asbestos-type material is required, e.g., as thermal insulation, as a reinforcing component of ceramics, cermets, and plastic films, in paper and other fiber compositions, and as a filtering medium, particularly for high temperature applications.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. Feltable titanium dioxide fibers having a fiber cross-section of less than 25 microns and an axial ratio of at least 10:1.

2. A felted mat of entangled, feltable titanium dioxide fibers, said fibers having a fiber cross-section of less than 25 microns and an axial ratio of at least 10:1.

3. Process for preparing feltable titanium dioxide fibers which comprises bringing a titanium tetrahalide and oxygen into contact with a metal halide melt, of the class consisting of alkali metal halide melts and alkaline earth metal halide melts, obtaining feltable titanium dioxide fibers, and isolating the feltable titanium dioxide fibers from the metal halide melt.

4. Process for preparing felted mats of fibrous titanium dioxide which comprises bringing a titanium tetrahalide and oxygen separately into contact with a metal halide melt of the class consisting of alkali metal halide melts and alkaline earth metal halide melts, obtaining feltable titanium dioxide fibers, cooling, dissolving the solidified metal halide melt, dispersing the titanium dioxide fibers by agitation in a suspending medium, and filtering the resulting suspension to obtain felted mats of fibrous titanium dioxide.

5. Titanium dioxide fibers having a cross sectional diameter of less than 5 microns and an axial ratio of at least 10:1.

References Cited in the file of this patent

UNITED STATES PATENTS

| | | |
|---|---|---|
| 1,885,934 | Mayer | Nov. 1, 1932 |
| 2,347,496 | Muskat et al. | Apr. 25, 1944 |
| 2,445,691 | Pechukas | July 20, 1948 |

OTHER REFERENCES

Barksdale: "Titanium," 1949 ed., pages 392–394, The Ronald Press Co., N.Y.

Rheinboldt et al.: in "Berichte," vol. 67 (1934), pages 375–6.

Ser. No. 292,742, Beck et al. (A.P.C.), published July 13, 1943.